March 31, 1953     K. F. EWESON     2,633,413

APPARATUS FOR MAKING ORGANIC FERTILIZER

Filed Nov. 17, 1951

INVENTOR
KARL FOLKE EWESON

BY
ATTORNEYS.

Patented Mar. 31, 1953

2,633,413

UNITED STATES PATENT OFFICE 2,633,413

APPARATUS FOR MAKING ORGANIC FERTILIZER

Karl Folke Eweson, New York, N. Y.

Application November 17, 1951, Serial No. 256,861

3 Claims. (Cl. 23—259.1)

This invention relates to apparatus for the making of organic fertilizer from organic waste materials.

In a prior Patent No. 2,474,833, issued to Eric W. Eweson on July 5, 1949, a process for making organic fertilizer is described in which organic waste materials such as garbage, sludge, manure and other refuse and waste materials are placed in a tank in which the propagation of aerobic bacteria is promoted by the controlled supply of air to the mass of material being treated and the controlled withdrawal of spent air and generated gases from the mass at vertically spaced intervals.

In the practice of the process, it has been found to be desirable to support the material at vertically spaced intervals, so that open spaces may be formed beneath each support to permit the controlled withdrawal of spent air and generated gases at vertically spaced intervals. Such supports cannot be in the form of solid decks as proposed in some prior processes, for such decks would prevent the movement of air through the mass of the material as required for the efficient operation of the Eweson process. Accordingly, grids consisting of spaced supporting elements have been used, the nature of the material being such that it bridges across the spaces between said supporting elements to sustain the load above, but without preventing flow of air upward through the material.

When it is desired to move the material from one level to the next lower level, however, it is necessary to break up said bridges so that the material may drop through the grids. This has been done by agitating the material with rotating arms, but the nature of the material is such that this has posed mechanical problems which have been difficult and expensive to solve.

In my copending application Serial No. 213,521, I have proposed to provide a novel type of supporting grid consisting of flexible strands which may be stretched taut to support the material or slacked off to break the bridging material so as to permit the material to drop to a lower level.

It is an object of the present invention to provide an improved arrangement of flexible supporting strands and improved means for stretching or slacking said strands.

Other objects and advantages of the invention will appear hereinafter.

A preferred embodiment of the invention selected for purposes of illustration is shown in the accompanying drawings, in which.

Figure 1:
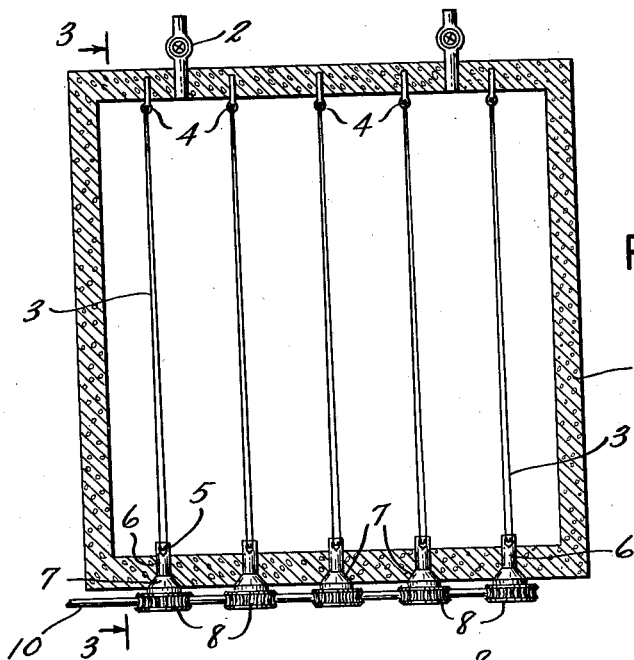
Figure 1 is a transverse cross section through a tank.
Figure 2:
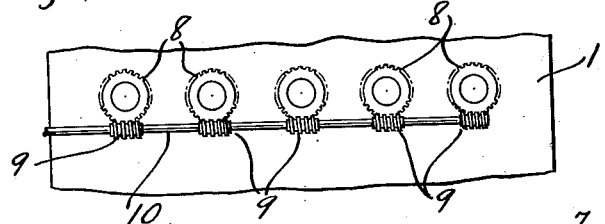
Figure 2 is a side elevation of a short section of a tank.
Figure 3:
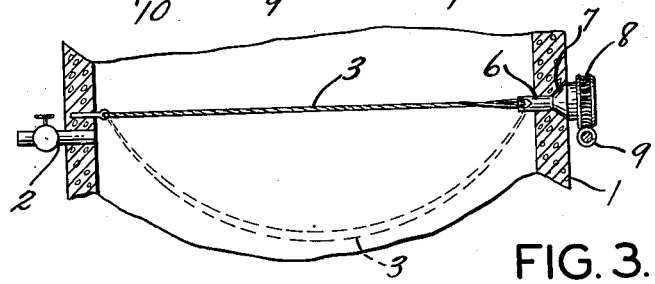
Figure 3 is a section on the line 3—3 of Figure 1.

Referring to the drawings, the invention is illustrated as applied to a rectangular tank 1 preferably constructed of reinforced concrete. The tank may be of any suitable height and should be provided with suitable valve controlled vent pipes 2 for the controlled withdrawal of spent air and generated gases in accordance with the teaching of the Eweson Patent No. 2,474,833. Also, as set forth in said patent, suitable means (not shown) should be provided for introducing controlled quantities of fresh air at the bottom of the tank.

Each of the supporting grids comprises a plurality of flexible strands 3, preferably of wire rope or chain. One end of each strand is anchored to the wall of the tank in any suitable manner as by an eye 4, and the other end is secured to a rotatable member 5 mounted in the side wall of the tank.

Figure 4:
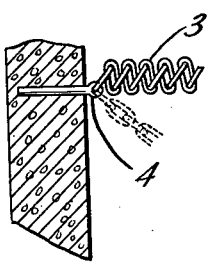
Figure 4 is an enlarged detail sectional view illustrating the use of chain.

According to the present invention, the strands are stretched taut or slacked off by twisting or untwisting the flexible strands. In the case of a chain, the twisting movement causes the links to draw together and nest as shown in Figure 4. In the case of wire rope, however, it is preferable to use a doubled strand. Thus, as shown in Figure 1, each strand comprises two plies which are twisted together when it is desired to stretch the strand taut and are untwisted when the strand is to be slacked off.

The member 5 comprises a shank 6 which extends through the wall of the tank and a conical portion 7 which engages a conical depression in the outside of the wall. The conical portion 7 provides a bearing surface which may be greased to provide lubrication and also to seal the joint against excessive leakage. Each of the members 5 may have a gear 8 secured thereto which may be operated in any suitable manner, either individually or in unison. For example, the gears 8 may mesh with a worm 9 on shaft 10 so that the members 5 may be rotated in unison to stretch or slack the respective strands. Shaft 10 may be rotated by hand or may be motor driven.

The above described construction has important advantages. The twisting of the strands, whether chain or wire rope, tends to increase the supporting surface and gives better support to the material above. Moreover, the twisting of the strands helps to break up lumps in the material while the untwisting motion helps to break the bridged material. Also since the twisting or untwisting of the strands changes the effective length of the strands very slowly, it is possible to control the fall of the material to better advantage.

It will be understood that the invention may be variously modified and embodied within the scope of the subjoined claims.

I claim as my invention:

1. Apparatus for making organic fertilizer, comprising, a tank, a grid extending across the interior of said tank, said grid comprising a plurality of spaced flexible strands, each of said strands having one end anchored to the tank wall and another end secured to a rotatable member substantially axially thereof, and means to rotate said member to twist and untwist said strand to stretch it taut and to slack it off.

2. Apparatus as claimed in claim 1 in which each of said strands comprises a plurality of plies which may be twisted together.

3. Apparatus as claimed in claim 1 in which said rotatable member comprises a shank extending through the wall of the tank and a bearing surface seated against a similar bearing surface of the tank wall.

KARL FOLKE EWESON.

REFERENCES CITED

The following references are of record in the file of this patent:

UNITED STATES PATENTS

| Number | Name | Date |
| --- | --- | --- |
| 1,056,632 | Croxton | Mar. 18, 1913 |
| 1,082,303 | Carr | Dec. 23, 1913 |
| 1,761,149 | Peebles | June 3, 1930 |

FOREIGN PATENTS

| Number | Country | Date |
| --- | --- | --- |
| 80,022 | Germany | July 12, 1894 |
| 198,756 | Great Britain | June 6, 1923 |
| 189,985 | Great Britain | Dec. 14, 1922 |